April 14, 1925.
C. L. VORESS ET AL
1,533,716
PROCESS AND APPARATUS FOR THE RECOVERY OF GASEOUS VAPORS
Filed Nov. 12, 1924
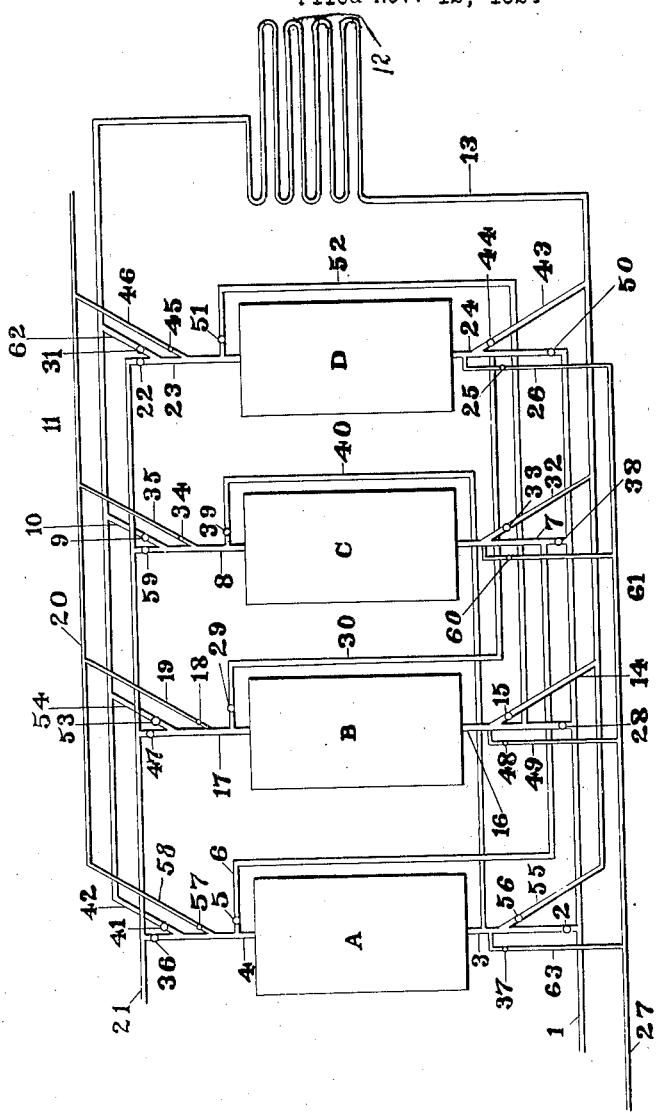
INVENTORS
C. L. Voress, V. C. Canter + R. W. Skoog
BY George A. Prevost
ATTORNEY Patented Apr. 14, 1925.

1,533,716

UNITED STATES PATENT OFFICE.

CLYDE LENNARD VORESS, VERNON CHARLES CANTER, AND ROBERT WALFRED SKOOG, OF CHARLESTON, WEST VIRGINIA.

PROCESS AND APPARATUS FOR THE RECOVERY OF GASEOUS VAPORS.

Application filed November 12, 1924. Serial No. 749,465.

*To all whom it may concern:*

Be it known that we, CLYDE L. VORESS, VERNON C. CANTER, and ROBERT W. SKOOG, citizens of the United States, residing at Charleston, in the county of Kanawha and State of West Virginia, have invented certain new and useful Improvements in Processes and Apparatus for the Recovery of Gaseous Vapors; and we do hereby declare the following to be a full, clear, and exact description of the invention, such as will enable others skilled in the art to which it appertains to make and use the same.

This invention relates to new and novel improvements in a process for recovering gaseous vapors from gas mixtures. One object of the invention is to provide an easily operated and efficient method for the recovery of gaseous vapors when found in relatively high saturations in gas mixtures. Another object of the invention is to provide a process and apparatus in which cooling after distillation may be carried out in two or more stages. A third object of the invention is to provide a process and apparatus in which the residue vapors after having a portion of the recoverable vapors removed, may be used to remove heat previously supplied in the distillation from a solid absorbent medium. Other objects will appear as the description and discussion of the process is presented hereinafter.

During the past few years, a process has been developed for continuously absorbing and separating vapors in and from solid absorbents consisting in passing a gaseous mixture containing vapors to be recovered into said absorbent, then introducing distilling vapors into the charged absorbent for sufficient time only to displace the first mentioned vapors and to deposit condensates from the distilling vapors in said absorbent, then introducing more of the first gaseous mixture into the absorbent to cool it and displace the distilling vapors at a temperature lower than that at which the vapors to be recovered were displaced by the distilling vapors. This is described and set out in United States Patent No. 1,420,613. In the commercial application of that process, it has been found that where the gaseous mixture contains a relatively high proportion of recoverable vapors, there is insufficient residue gas to carry away the required quantity of heat from the solid absorbent and from the walls of the container, etc., to reduce the temperature of the solid absorbent at the end of the cooling division of the cycle approximately to that of the entering gas. Although it is not absolutely necessary that the temperature be reduced that low, it is desirable and the following described process and apparatus are so designed as to accomplish that result. We realize that three or four or any number of cooling stages might be added and do not wish to limit ourselves to just two cooling stages, although in most cases two stages are all that will be necessary.

The apparatus consists in containers A, B, C and D, filled with a solid absorbent medium such as activated charcoal having valved conduits attached both at the top and the bottom as shown in the drawing filed herewith, permitting both the gaseous mixture and the distilling vapors to be controlled at the will of the operator. The operation is as follows:

*First step.*—The gaseous mixture will enter through line 1, pass through valve 2 through line 3 into container and through the absorbent in container "A" out line 4, through valve 5, through by-pass line 6 into line 7 then into container "C" through the absorbent in container "C", out line 8, through valve 9 into line 10, then through line 11, through cooler 12, through line 13 and line 14, through valve 15 and line 16 into container "B", then through absorbent in container "B" out line 17, through valve 18 into line 19, into line 20 and then to such point as the operator may desire. In the meantime, distilling vapors have been entering through line 21, valve 22 and line 23 into container "D" through the absorbent in container "D" where vapors absorbed in a previous step are displaced and carried away out line 24, valve 25, through line 26 and 27 to such point as the operator may desire.

*Second step.*—The gaseous mixture will enter through line 1, pass through valve 28 through line 16 into container "B" and through the absorbent in container "B", out line 17 through valve 29, through by-pass line 30 into line 24 then into container "D" out line 23, through valve 31 into line 11 through cooler 12, through line 13, and line 32 through valve 33 into container "C", out line 8, through valve 34 into line 35 into line 20 and then to such point as the operator may desire. In the meantime, distilling vapors have been entering through line 21, valve 36 and line 4 into container "A" through the absorbent in container "A" where vapors absorbed in a previous step are displaced and carried away, out line 3, valve 37, through line 27 to such points as the operator may desire.

*Third step.*—The gaseous mixture will enter through line 1, pass through valve 38, through line 7 into container "C", through the absorbent in container "C" out line 8, through valve 39 through line 40, into line 3 through the absorbent in container "A" out line 4 into valve 41, into line 42, into line 11, through cooler 12, through line 13 and line 43, through valve 44, through line 24 into container "D" out line 23, through valve 45 into line 46 into line 20 and then to such point as the operator may desire. In the meantime, distilling vapors have been entering through line 21, valve 47 and line 17, into container "B" through the absorbent in container "B" where vapors absorbed in a previous step are displaced and carried away, out line 16, valve 48 through line 49 and line 27 to such points as the operator may desire.

*Fourth step.*—The gaseous mixture will enter through line 1, pass through valve 50 through line 24 into container "D" and through the absorbent container "D", out line 23, through valve 51, through line 52 into line 16 then into container "B" out line 17, through valve 53 into line 54, and line 11, through cooler 12, through line 13, and line 55, through valve 56 into absorbent container "A", out line 4, through valve 57 into line 58, into line 20 and then to such point as the operator may desire. In the meantime, distilling vapors have been entering through line 21, valve 59 and line 18 into container "C" through the absorbent in container "C" where vapors absorbed in a previous step are displaced and carried away out line 7, valve 60, through line 61 and 27 to such point as the operator may desire.

As a direct example of a specific application of the process hereinbefore described in detail, we point out its use in the recovery of gasoline from natural gas when activated charcoal is the absorbent medium. In carrying out the three phase displacement as described in the hereinbefore referred to U. S. Patent No. 1,420,613 we find that any natural gas containing recoverable gasoline vapors in amounts varying from one and one-half to two gallons per thousand cubic feet or higher amounts than this, when contracted at a normal temperature of between 40 and 100 to 125° depending upon atmospheric conditions, will leave insufficient residue gas after the recoverable vapors have been removed to cool the charcoal and displace the water vapor which was previously supplied by a steam distillation, to a temperature approaching the temperature of the inlet natural gas and a condition where the major portion of the absorbed water has been displaced. This is largely due to the fact that a bed of activated charcoal has a capacity to absorb and hold a pretermined amount of natural gasoline. For example, let us assume that a bed containing 1000 lbs. of charcoal has a capacity to absorb approximately twenty-five gallons of gasoline. If this twenty-five gallons of gasoline is taken from natural gas having a gasoline content of one gallon per 1000 cu. ft., then 25,000 cu. ft., of gas would be passed through the charcoal, leaving a residue after the gasoline vapors have been absorbed of approximately 24,250 cu. ft. Now if this same bed of charcoal was exposed to natural gas having a gasoline content of five gallons per thousand cubic feet, only 5000 cu. ft., of natural gasoline vapor mixture would have to be passed through the bed to saturate it and the residue would only be approximately 4250 cu. ft., assuming one gallon of gasoline vaporized equivalent to 30 cu. ft. of gaseous vapor. The relative saturation of the charcoal which could be carried when contacting gas with a five gallon content as against a one gallon content is only slightly different from these figures. It may readily be seen that while in the first instance, 24,250 cu. ft. of residue gas would be available for cooling purposes, only 4,250 cu. ft. would be available in the second instance. By the novel improvement herein described, the residue gas in the second part of the cycle after having been passed through the first container and allowed to absorb as much heat as possible, would be passed through a primary cooler where as much heat as could be exchanged would be removed and the gas passed through a second bed of charcoal which has in the second step of the previous cycle been subjected to the primary cooling step. This secondary cooling would carry away another portion of the excess heat, although the amount would not be as great as that carried away in the first step, since the temperature of the charcoal bed would have been reduced in the primary passage of the gas.

It is quite evident that as many other cooling steps might be added as desired. It is quite evident from this description that the addition of the extra cooling step modifies the cooling step of the three step cycle absorption process described in the hereinbefore mentioned U. S. Patent No. 1,420,613 to a four step cycle process. Each step of the cycle is composed of the three parts: First, passing a gaseous mixture containing vapors to be recovered in contact with the absorbent; second, introducing distilling vapors into the charged absorbent for a sufficient time only, to displace the first mentioned vapors and to deposit condensed vapors from the distilling vapors in said absorbent; third, introducing more of the first gaseous mixture into the absorbent to cool it and displace the distilling vapors at a temperature lower than that at which the vapors to be recovered were displaced by the distilling vapors. In other words, it requires four complete steps of the three parts each, before each of the four beds has been subjected to the same treatment and a cycle completed. If the number of cooling steps were increased it would require as many steps of three parts each as there are beds before a complete round of the system would be completed.

What we claim and desire to secure by Letters Patent is:—

1. A process for the extraction of gaseous vapors from gas mixtures which consists in a multiple step system, each step having the successive parts of absorption of recoverable vapors in a solid absorbent displacement absorbed vapors by distilling vapors and cooling with the lighter vapors carried along with the residue vapors from the previous absorption in multiple successive contacts, wherein forced cooling by conventional means is resorted to between each of the last mentioned successive multiple contacts.

2. A process for the extraction of gaseous vapors from gas mixtures which consists in a four step system, each step having the successive parts of absorption of recoverable vapors in a solid absorbent displacement of absorption vapor by distilling vapors and cooling with the lighter vapors carried along with the residue vapors from the previous absorption in two successive contacts with conventional cooling and withdrawal of any condensates between the two contacts.

3. A process for the extraction of gasoline vapors from natural gas which consists in a multiple step system, each step having the successive parts of absorption of recoverable vapor in a solid absorbent displacement of absorbed vapor by distilling vapors and cooling with the lighter vapors carried along with the residue vapors from the previous absorption in multiple successive contacts, wherein forced cooling by conventional means is resorted to between each of the last mentioned successive multiple contacts.

4. A process for the extraction of gasoline vapors from natural gas which consists in a four step system, each step having the successive parts of absorption of recoverable vapor in a solid absorbent displacement of absorbed vapors by distilling vapors and cooling with the lighter vapors carried along with the residue vapors from the previous absorption in two successive contacts with cooling and withdrawal of any condensates between the two contacts.

5. A process for the extraction of gasoline vapors from natural gas which consists in a four step system, each having the successive parts of absorption of recoverable vapors in activated charcoal displacement of absorbed vapors by distilling vapors and cooling with the lighter vapors carried along with the residue vapors from the previous absorption in two successive contacts with cooling and withdrawal of any condensates between the two contacts.

6. In a process for the extraction of gaseous vapors from gas mixtures a method of cooling which consists in subjecting a gaseous mixture to a solid absorbent already heated and partially saturated with water vapors wherein the water vapors are displaced and the absorbent cooled by a number of successive contacts with said gaseous mixture, said solid being in four or more beds, and between each contact the gaseous mixture being subjected to cooling and the separation of liquid condensates.

7. In a process for the recovery of gasoline from natural gas mixtures a method of cooling which consists in subjecting a gaseous mixture to a solid absorbent already heated and partially saturated with water vapors wherein the water vapors are displaced and the absorbent cooled by a number of successive contacts with said gaseous mixture, said solid being in four or more beds, between each contact the gaseous mixture being subjected to cooling and the separation of liquid condensates.

8. In a process for the recovery of gasoline from natural gas mixtures a method of cooling which consists in subjecting a gaseous mixture to activated charcoal already heated and partially saturated with water vapors wherein the water vapors are displaced and the absorbent cooled by a number of successive contacts with said gaseous mixture, said solid being in one or more beds, between each contact the gaseous mixture being subjected to cooling and the separation of liquid condensates.

9. An apparatus for the recovery of gaseous vapors from gaseous mixtures consisting in a multiple number of containers of such character that they may be charged with a solid absorbent, each having the following connections and conduits; one valved inlet conduit and one valved exit conduit for conveying gaseous mixtures; a second valved inlet conduit and a second valved exit conduit connected through a cooling system, a gas cooler of conventional type, a valve gaseous vapor conduit extending from one end of each container to the opposite end of a second container separated from said first container by at least one intervening container, a valved conduit for carrying distilling vapors into each container and a conduit for carrying distilling and distilled vapors from each container.

10. An apparatus for the recovery of gaseous vapors from gas mixtures which consists of four containers of such character that they may be charged with a solid absorbent, each having the following valved conduits; valved inlet conduit, valved exit conduit for conveying gas mixtures, a second valved exit pipe and a second valved inlet pipe connected through a cooler system, a gas cooler of conventional type, a valved gaseous vapor conduit extending from the end of each container to the opposite end of a second container, separated from the first container by at least one intervening container, a valved conduit for carrying distilling vapors into each container and a conduit for carrying distilled and distilling vapors from each container.

11. A cooling method which consists in subjecting cooled gaseous vapors to a heated solid absorbent, partially saturated with displaceable gaseous vapors in successive contacts employing cooling of the gaseous vapors not absorbed between each contact.

In testimony whereof we affix our signatures.

CLYDE LENNARD VORESS.
VERNON CHARLES CANTER.
ROBERT WALFRED SKOOG.